United States Patent Office 3,483,677
Patented Dec. 16, 1969

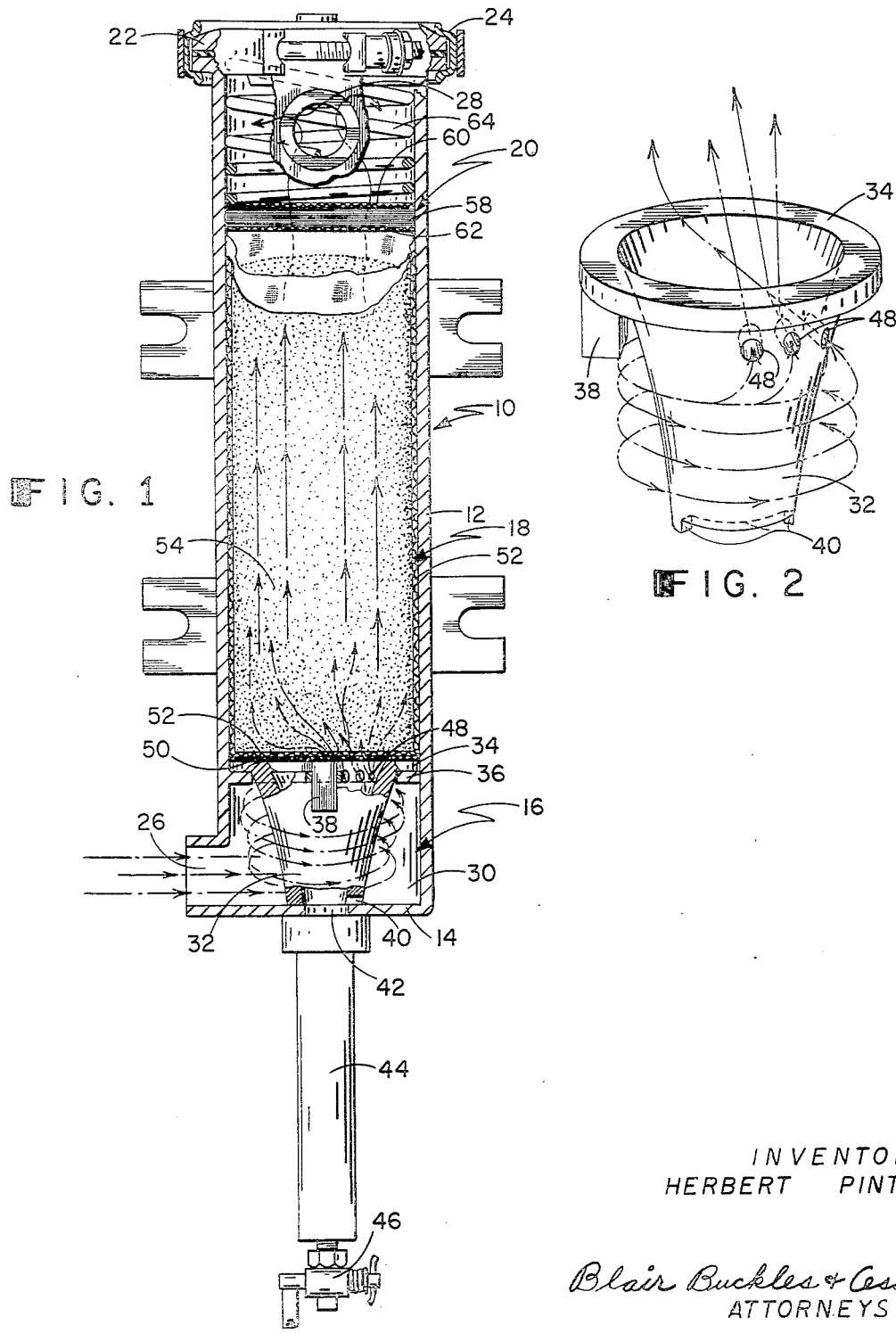

3,483,677
AIR CLEANING DEVICE
Herbert Pinto, 143 Prospect St.,
Reading, Mass. 01867
Filed Feb. 6, 1967, Ser. No. 614,318
Int. Cl. B01d 53/00
U.S. Cl. 55—316                                    1 Claim

ABSTRACT OF THE DISCLOSURE

A unitary air cleaning assembly removes both moisture and solid particulate matter. Incoming air is centrifuged to remove moisture droplets and it then passes through a bed of hydrophilic material which removes the remaining moisture, as well as coarse particles. The fine particles are removed by a secondary filter prior to exit of the air from the filter assembly. The unit provides an efficient cleaning function in minimum space and, furthermore, is characterized by relatively low back pressure.

BACKGROUND OF THE INVENTION

Field of the invention

The filters to which the present invention is directed are used primarily to clean the outputs of air compressors. In many applications the air supplied by the compressor must be clean, by which I mean free from moisture, as well as solid particles. For example, the air may be used to ventilate delicate equipment or even to operate pneumatic devices which are sensitive to moisture and dirt. On the other hand, the air drawn in by the compressors is generally not clean and, furthermore, the compressors themselves add to the contamination.

Prior art

Therefore, the air leaving the compressor is often subjected to filtration and moisture removal, and there are a large number of devices available for this purpose. These include fibrous filters for dirt removal and hydrophilic beds for moisture removal.

The present invention aims to improve on these devices by providing a compact unit that effectively removes both the moisture and solid material from the air stream, as opposed to the separate devices previously used for this purpose.

Another object of the invention is to provide an air cleaning assembly that is relatively compact for a system providing both these functions.

A further object of the invention is to provide an air cleaning assembly in which the replaceable elements need be replaced only at relatively long intervals.

Yet another object of the invention is to provide an air cleaning assembly characterized by a relatively low back pressure.

A still further object of the invention is to provide an air cleaning assembly having the above features which is also relatively low in cost.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claim.

SUMMARY OF THE INVENTION

In general, the invention provides a unitary filtering and moisture-removal system housed in a vertically-extending tube. The air from the compressor enters at one end of the tube and is immediately subjected to a rotary motion of sufficient magnitude to separate droplets of moisture from the moving air mass by means of centrifugal action. The air then passes along the tube through a bed of hydrophilic material, such as silica gel, and this completes the moisture removal. At the same time, the gel particles serve as a primary filter to retain the larger particles of solid material entrained in the air stream. Finally, the stream passes through a secondary filter having a relatively fine structure, so as to entrap the more minute particles.

As will be seen, the entire unit is relatively compact. This is partly due to the design of the individual elements of the assembly and also to the fact that the hydrophilic bed serves the dual purpose of removing moisture and particulate material from the gaseous stream. Moreover, by retaining the large particles, the bed prevents them from plugging the secondary or fine filter, thereby substantially lengthening the life of the latter. Yet, because of the structure of the hydrophilic bed, it is not appreciably plugged by the large particles. The resulting advantages in filter cost and maintenance, together with the reduction in back pressure occasioned by the use of a dual filter arrangement, will be readily apparent to those who have occasion to use air cleaning systems of this nature.

Moreover, the centrifuge that separates moisture droplets from the air stream is relatively small and operates without any moving parts. Again, there are readily apparent advantages to be gained, both in initial cost and maintenance, from this configuration.

DESCRIPTION OF DRAWINGS

For a fuller understanding of the nature and objects of the invention, reference should be had to the following detailed description taken in connection with the accompanying drawings, in which:

FIG. 1 is a vertical section of an air cleaning assembly embodying the invention; and FIG. 2 is a perspective view of the drum used in the droplet-removing centrifuge of FIG. 1.

DESCRIPTION OF THE PREFERRED EMBODIMENT

As shown in FIG. 1, an air cleaning unit incorporating the invention is enclosed within a housing, generally indicated at 10, comprising a preferably circular tube 12 closed off by an integral bottom 14. Adjacent to the bottom 14 is a centrifuge 16 above which a primary filter 18 is disposed. Immediately above the filter 18 is a secondary filter 20. The top of the tube 12 is closed off by a removable, gasketed cover 22 held in place by a suitable clamping assembly 24. Air to be cleaned by the unit enters through an inlet stub 26 adjacent to the bottom of the tube 12 and leaves through an exit port 28 above the secondary filter 20.

The inlet stub 26 has a tangential orientation with respect to the tube 12, and consequently, air entering the stub 26 from a compressor (not shown) undergoes a rapid circular motion in the annular chamber 30 between the tube 12 and a centrally-disposed drum 32. The resulting centrifugal action separates droplets of moisture from the air stream, the droplets descending to the bottom of the unit.

As shown in FIGS. 1 and 2, the drum 32 preferably has the general shape of an inverted frustum. It has an integral top flange 32 that rests on a ring 36 integral with the housing 10, thereby closing off the upper end of the chamber 30. A tang 38 extending downwardly from the flange 34 engages a slot in the ring 36 to ensure the desired angular orientation of the drum 32 as described below. The drum is also provided with a recess 40 at its bottom end to permit water at the bottom of the chamber 30 to flow into the interior of the drum and then down through an aperture 42 to a collecting tube 44 suitably attached to the bottom 14. From time to time the tube 44 can be drained by means of a valve 46 at the bottom thereof. The air leaves the chamber 30 through holes 48 extending into the interior of the drum 32 adjacent to the flange 34.

The frusto-conical configuration of the drum 32 appears to enhance the efficiency of the centrifuge 16. Apparently, this is associated with the fact that the width of the chamber 30 decreases as the air stream spirals upwardly toward the holes 48, thereby increasing the air velocity. Thus, there is a gradual increase in the centrifugal forces with the result that progressively finer moisture droplets are centrifuged out as the air stream ascends in the chamber 30.

Furthermore, the exit holes 48 in the drum 32 are on the opposite side of the chamber 30 from the entrance stub 26. This largely prevents the entering air stream from passing directly to the holes 48 without having first traversed the desired circular path required for centrifugation. The preferred orientation of the holes is provided by means of the positioning tank 38 and slotted ring 36, as described above.

After passing inwardly through the holes 48, the air stream proceeds upward into the primary filter 18, which also operates as a secondary drier. In the filter 18 it passes first through a screen 50 that supports a bag 52 containing particles of hydrophilic material such as silica gel. The bed 54 extracts substantially all of the remaining moisture in the air stream and filters out the larger solid particles entrained in the air stream.

The third stage, which comprises the secondary filter 20, is disposed immediately above the bag 52, comprises a plurality of fibrous discs 58 between a pair of screens 60 and 62. The discs 58 remove the remaining particles from the air stream, i.e., the fine particles passed by the primary filter 18.

Immediately above the secondary filter 20 is a compression spring 64 maintained under compression by the cover 22. The spring 64 ensures that the bed 54 in the primary filter 18 is packed sufficiently tight to contact substantially all of the air stream passing through the primary filter, thereby enhancing the moisture removal efficiency of the hydrophilic material in the bed 54. Moreover, the close packing maintains the desired particle-removing characteristic of the bed 54.

Additionally, the compression exerted by the spring 64 forces the primary filter 18 against the inner wall of the tube 12 and does the same for the discs 58 in the secondary filter 20, thereby preventing the air stream from passing around the primary and secondary filters. In high volume applications, where there is a very substantial upwardly directed force resulting from the flow through the assembly, the spring is replaced by a rigid annular spacer having an aperture coinciding with the exit port 28. The downward force exerted by the cover 22 on the spacer provides the desired compressive action, which is enhanced by the upward force exerted by the flowing gas.

It will be apparent that the foregoing construction provides highly efficient air cleaning in a minimum space. Moreover, there is a minimum of parts, all of which are simple in design and easily fabricated. In this connection it is important to note that the centrifuge 16 requires no moving parts and thus is essentially maintenance free. Replacement of the primary and secondary filters is easily accomplished by removing the cover 22.

The centrifuge 16 might be placed at the top of the unit, with some modification in design, and the air stream be made to flow downwardly from the centrifuge through the primary and then the secondary filter. Alternatively, the entire unit might be modified to provide for a horizontal orientation of the housing. However, the illustrated vertical orientation with the centrifuge 16 at the bottom is generally to be desired because of its simplicity, particularly as regards the configuration of the housing 10.

The unit may also be modified by including a sterilizing function for use in respiratory applications. Additionally, for low temperature environments an outer jacket may be added and a warming fluid passed between the jacket and the housing 10 to prevent freezing of moisture within the housing.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:
1. A gas cleaning unit comprising
   (A) a housing,
   (B) a gas inlet near one end of said housing arranged to receive a particle-laden gas stream and directed tangentially into said housing,
   (C) a gas outlet near the other end of said housing,
   (D) a frustoconical drum having its larger end downstream of said inlet, said drum
      (1) being positioned in said housing adjacent to said inlet coaxially with the longitudinal axis of said housing so as to define an annular space between said drum and the housing wall,
      (2) arranged so that it increases in diameter in the direction of said outlet, and
      (3) having a relatively large cone angle so that
         (a) the incoming tangentially directed gas is constrained to spiral along the axis of said housing in said annular space, and
         (b) said annular space has a relatively rapidly decreasing cross section due to the increasing diameter of the drum, whereby there is an increase in the velocity of the spiraling gas which produces an increasing centrifugal force acting on the particle in the gas so that proportionally finer particles are centrifuged out of the gas as it spirals toward said outlet,
   (E) a bed of hydrophilic material positioned in said housing beyond said drum for removing moisture from the gas flowing out of said annular space,
   (F) a filter positioned in said housing beyond said bed for removing fine particles from the gas, and
   (G) removable cover means closing off the top of said housing, and means extending from said cover means and in contact with said filter to maintain said bed and filter under compression.

References Cited

UNITED STATES PATENTS

| | | | |
|---|---|---|---|
| 1,532,657 | 4/1925 | Fleisher | 55—323 |
| 2,383,065 | 8/1945 | Lehman | 55—316 |
| 2,768,707 | 10/1956 | Campbell | 55—320 |
| 3,010,537 | 11/1961 | Baker et al. | 55—323 |
| 3,246,454 | 4/1966 | Norton | 55—316 |
| 1,376,691 | 5/1921 | Hartman | 55—316 X |
| 2,071,811 | 2/1937 | Bartuska et al. | 55—316 X |
| 2,593,132 | 4/1952 | Gannon | 55—316 X |
| 2,798,718 | 7/1957 | Gross | 55—316 X |
| 2,922,488 | 1/1960 | Gruner | 55—316 |

FOREIGN PATENTS 869,938   3/1953   Germany.

HARRY B. THORNTON, Primary Examiner

U.S. Cl. X.R.

55—337, 475